United States Patent
Lee et al.

(10) Patent No.: US 11,898,029 B2
(45) Date of Patent: Feb. 13, 2024

(54) THERMOPLASTIC RESIN COMPOSITION

(71) Applicant: LG CHEM, LTD., Seoul (KR)

(72) Inventors: Roo Da Lee, Daejeon (KR); Jeong Su Choi, Daejeon (KR); Won Seok Lee, Daejeon (KR); Sang Hoo Park, Daejeon (KR); Jong Ju Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 321 days.

(21) Appl. No.: 17/275,142

(22) PCT Filed: Jun. 4, 2020

(86) PCT No.: PCT/KR2020/007286
§ 371 (c)(1),
(2) Date: Mar. 10, 2021

(87) PCT Pub. No.: WO2020/251215
PCT Pub. Date: Dec. 17, 2020

(65) Prior Publication Data
US 2021/0355313 A1    Nov. 18, 2021

(30) Foreign Application Priority Data

Jun. 13, 2019 (KR) .................. 10-2019-0070232
Jun. 2, 2020  (KR) .................. 10-2020-0066697

(51) Int. Cl.
*C08L 51/04* (2006.01)

(52) U.S. Cl.
CPC ........... *C08L 51/04* (2013.01); *C08L 2205/03* (2013.01); *C08L 2205/06* (2013.01)

(58) Field of Classification Search
CPC .............................. C08L 51/04; C08F 220/14
See application file for complete search history.

(56) References Cited

U.S. PATENT DOCUMENTS

| | | | |
|---|---|---|---|
| 2001/0051688 A1 | 12/2001 | Kurata | |
| 2002/0147266 A1 | 10/2002 | Rawlinson et al. | |
| 2009/0156719 A1* | 6/2009 | Jin | C08L 55/02 525/71 |
| 2010/0048816 A1 | 2/2010 | Ryu et al. | |
| 2013/0165577 A1 | 6/2013 | Jang et al. | |
| 2013/0281603 A1 | 10/2013 | Jin et al. | |
| 2017/0183455 A1 | 6/2017 | Yoo | |
| 2017/0198132 A1 | 7/2017 | Choi et al. | |
| 2017/0233548 A1 | 8/2017 | Pfeiffer et al. | |
| 2018/0002521 A1 | 1/2018 | Jang | |
| 2018/0022891 A1 | 1/2018 | Pfeiffer et al. | |
| 2018/0230301 A1 | 8/2018 | Choi et al. | |
| 2018/0282511 A1 | 10/2018 | Pfeiffer et al. | |
| 2020/0115479 A1 | 4/2020 | Shibata | |
| 2021/0040312 A1* | 2/2021 | Kakimoto | C08L 51/04 |
| 2021/0115242 A1* | 4/2021 | Choi | C08L 51/003 |

FOREIGN PATENT DOCUMENTS

| | | |
|---|---|---|
| CN | 1320649 A | 11/2001 |
| CN | 107207825 A | 9/2017 |
| CN | 108137853 A | 6/2018 |
| IN | 105612214 A | 5/2016 |
| JP | 2000-297194 A | 10/2000 |
| JP | 2002-003548 A | 1/2002 |
| JP | 2004-217738 A | 8/2004 |
| JP | 2006028286 A | 2/2006 |
| KR | 10-2002-0064190 A | 8/2002 |
| KR | 10-2008-0072601 A | 8/2008 |
| KR | 10-2011-0077590 A | 7/2011 |
| KR | 10-2012-0078583 A | 7/2012 |
| KR | 10-2013-0074427 A | 7/2013 |
| KR | 10-2014-0089920 A | 7/2014 |
| KR | 10-2017-0025900 A | 3/2017 |
| KR | 10-2017-0069456 A | 6/2017 |
| WO | WO2016052832 A | 4/2016 |
| WO | 2018/220961 A1 | 12/2018 |
| WO | WO 2020050639 | * 3/2020 |

OTHER PUBLICATIONS

Changri Han et al., "Production Process and Technology of Rubber and Plastic Additives," Scientific and Technical Documentation Press, Nov. 2015, pp. 347-348.
Extended European Search Report for Application No. 20821769.5, dated Oct. 4, 2021.

* cited by examiner

*Primary Examiner* — Jeffrey C Mullis

(57) ABSTRACT

Provided is a thermoplastic resin composition which includes: a base resin including, in a weight ratio of 70:30 to 90:10, a first copolymer formed by graft polymerization of a diene-based rubber polymer having an average particle diameter of 50 to 200 nm with a first monomer mixture including an alkyl(meth)acrylate-based monomer and an aromatic vinyl-based monomer and a second copolymer which is a copolymer of a second monomer mixture including an alkyl(meth)acrylate-based monomer and an aromatic vinyl-based monomer; and a plasticizer.

7 Claims, No Drawings

THERMOPLASTIC RESIN COMPOSITION

CROSS-REFERENCE TO RELATED APPLICATION

This application is a National Phase of International Application No. PCT/KR2020/007286 which claims priority to and the benefit of Korean Patent Application No. 10-2019-0070232, filed on Jun. 13, 2019, and Korean Patent Application No. 10-2020-0066697, filed on Jun. 2, 2020, the disclosures of which are incorporated herein by reference in their entirety.

TECHNICAL FIELD

The present invention relates to a thermoplastic resin composition, and more specifically, to a thermoplastic resin composition excellent in transparency, processability, and softness.

BACKGROUND ART

Artificial nails are mainly manufactured by injection molding. Acrylonitrile/butadiene/styrene (ABS) thermoplastic resin compositions including an ABS graft copolymer have been commonly used for artificial nails because the ABS thermoplastic resin compositions facilitate the separation of a molded body from an injection machine and do not generate burrs. Meanwhile, general ABS thermoplastic resin compositions are hard. When hard artificial nails are attached to natural nails with an adhesive, the artificial nails are highly likely to be detached therefrom due to different curvatures of consumers' nails. In addition, wearing comfort is lowered due to the force of the artificial nail to restore the original shape in an attached state to a consumer's nail. To compensate for these drawbacks, a method of manufacturing artificial nails using ethylene vinyl acetate or a styrene/butadiene copolymer was proposed. However, since artificial nails manufactured by the method are soft, there is a drawback in which the end of an artificial nail is easily bent due to an external impact when worn. To overcome such a drawback, a method of mixing an ABS graft copolymer with ethylene vinyl acetate or a styrene/butadiene copolymer was also proposed. Recently, transparent artificial nails have been commonly used to create a variety of designs for satisfying individual personality or taste, but when a methyl methacrylate/butadiene/styrene copolymer, which is a transparent graft copolymer, is mixed with ethylene vinyl acetate or a styrene/butadiene copolymer, there is a limitation in maintaining transparency due to a difference in refractive index between two materials. Meanwhile, as a rubber content is increased in compounding of a methyl methacrylate/butadiene/styrene copolymer, softness is increased, but haze is increased, resulting in low transparency, degraded color, and degraded processability.

Therefore, there is ongoing research on the development of a thermoplastic resin composition for an artificial nail, which is excellent in all of transparency, processability, and softness.

DISCLOSURE

Technical Problem

The present invention provides a thermoplastic resin composition excellent in transparency, processability, and softness.

Technical Solution

One aspect of the present invention provides a thermoplastic resin composition which includes: a base resin including, in a weight ratio of 70:30 to 90:10, a first copolymer formed by graft polymerization of a diene-based rubber polymer having an average particle diameter of 50 to 200 nm with a first monomer mixture including an alkyl (meth)acrylate-based monomer and an aromatic vinyl-based monomer and a second copolymer which is a copolymer of a second monomer mixture including an alkyl(meth)acrylate-based monomer and an aromatic vinyl-based monomer; and a plasticizer.

Another aspect of the present invention provides a thermoplastic resin molded article made of the above-described thermoplastic resin composition and having a haze of 2.0% or less, a flexural strength of 280 to 420 kg/cm$^2$, and a flexural modulus of 11,000 to 13,500 kg/cm$^2$.

Advantageous Effects

A thermoplastic resin composition according to the present invention is excellent in all of transparency, processability, and softness. Therefore, the thermoplastic resin composition according to the present invention can be used to manufacture artificial nails which are transparent, enable the realization of various colors, and have excellent wearing comfort.

Modes of the Invention

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the average particle diameter of a diene-based rubber polymer may be measured by a dynamic light scattering method, specifically, by using a Nicomp 380 instrument (manufactured by PSS).

In the specification, the average particle diameter may refer to an arithmetic average particle diameter in the particle size distribution as measured by a dynamic light scattering method, that is, an average particle diameter based on a scattering intensity distribution.

In the present invention, viscosity may be measured using a Brookfield viscometer under the following conditions.

Spindle type: Cone type (CPA-52Z), Cone angle=3°, Cone radius=1.2 cm, Gap: 13 µm or less, Measurement shear rate: 10 to 20/sec, and Measurement temperature: 25° C.

In the present invention, a refractive index refers to an absolute refractive index of a material and is recognized as the ratio of the speed of electromagnetic radiation in free space to the speed of the radiation in the material, wherein the radiation may be the visible light having a wavelength of 450 nm to 680 nm, specifically, visible light having a wavelength of 589.3 nm. The refractive index may be measured by a known method, i.e., using an Abbe refractometer.

In the present invention, the degree of grafting may be calculated by the following Equation 1 after 1 g of first copolymer powder is dissolved in 50 g of acetone while stirring for 24 hours and then centrifuged in a centrifuge (Supra 30K manufactured by Hanil Science Industrial) at 16,000 rpm and −10° C. for 4 hours to separate a supernatant and a precipitate, and the precipitate is dried in a hot air dryer set at 50° C. for 12 hours, and then the obtained dry solid is weighed:

Degree of grafting (%)={(Weight of copolymer of grafted monomer mixture[1])/(Weight of diene-based rubber polymer[2])}×100    [Equation 1]

1) Weight of copolymer of grafted monomer mixture= (Weight of dry solid)−(Weight of diene-based rubber polymer)

2) Weight of diene-based rubber polymer=Weight (based on solid content) of theoretically added diene-based rubber polymer or Weight of diene-based rubber polymer as measured by analyzing a first copolymer through infrared spectroscopy In the present invention, the weight-average molecular weight of a shell of a first copolymer may be measured as a relative value with respect to a standard polystyrene (PS) sample by gel permeation chromatography (GPC) after the dry solid obtained by drying the supernatant as described in the measurement method of the degree of grafting is dissolved in a tetrahydrofuran (THF) solution and then filtered through a 1-µm filter.

In the present invention, the weight-average molecular weight of a second copolymer may be measured as a relative value with respect to a standard PS sample by GPC (Waters Breeze) using THF as a solution.

In the present invention, haze may be measured in accordance with ASTM D1003.

In the present invention, flexural strength and flexural modulus may be measured in accordance with ASTM D790.

In the present invention, the alkyl(meth)acrylate-based monomer may be a $C_1$ to $C_{10}$ alkyl(meth)acrylate-based monomer. The $C_1$ to $C_{10}$ alkyl(meth)acrylate-based monomer may be one or more selected from the group consisting of methyl(meth)acrylate, ethyl(meth)acrylate, propyl(meth)acrylate, butyl(meth)acrylate, 2-ethylhexyl(meth)acrylate, decyl(meth)acrylate, and lauryl(meth)acrylate, with methyl methacrylate being preferred.

In the present invention, the aromatic vinyl-based monomer may be one or more selected from the group consisting of styrene, α-methyl styrene, α-ethyl styrene, and p-methyl styrene, with styrene being preferred.

In the present invention, the vinyl cyanide-based monomer may be one or more selected from the group consisting of acrylonitrile, methacrylonitrile, phenyl acrylonitrile, and α-chloroacrylonitrile, with acrylonitrile being preferred.

1. Thermoplastic Resin Composition

A thermoplastic resin composition according to an embodiment of the present invention includes: 1) 100 parts by weight of a base resin including, in a weight ratio of 70:30 to 90:10, a first copolymer formed by graft polymerization of a diene-based rubber polymer having an average particle diameter of 50 to 200 nm with a first monomer mixture including an alkyl(meth)acrylate-based monomer and an aromatic vinyl-based monomer and a second copolymer which is a copolymer of a second monomer mixture including an alkyl(meth)acrylate-based monomer and an aromatic vinyl-based monomer; and 2) a plasticizer.

Hereinafter, each component of the thermoplastic resin composition according to an embodiment of the present invention will be described in detail.

1) Base Resin

The base resin includes (1) the first copolymer and (2) the second copolymer.

Hereinafter, each component of the base resin will be described in detail.

(1) First Copolymer

The first copolymer is a graft copolymer formed by graft copolymerization of a diene-based rubber polymer having an average particle diameter of 50 to 200 nm with a first monomer mixture including an alkyl(meth)acrylate-based monomer and an aromatic vinyl-based monomer.

The diene-based rubber polymer may have an average particle diameter of 50 to 200 nm and preferably has an average particle diameter of 70 to 180 nm. When the above-described range is satisfied, even when an excessive amount of the first copolymer is included in the thermoplastic resin composition, excellent transparency can be realized. Below the above-described range, the impact resistance of the thermoplastic resin composition may be significantly degraded, and above the above-described range, the transparency of the thermoplastic resin composition may be degraded.

The diene-based rubber polymer may be a synthetic rubber formed by crosslinking conjugated diene-based monomers. The conjugated diene-based monomer may be one or more selected from the group consisting of 1,3-butadiene, isoprene, chloroprene, piperylene, dicyclopentadiene, ethylidene norbornene, and vinyl norbornene, with 1,3-butadiene being preferred.

The alkyl(meth)acrylate-based monomer may impart excellent transparency to the first copolymer. The alkyl (meth)acrylate-based monomer may be included at 64 to 75 wt % or 68 to 72 wt % with respect to the total weight of the first monomer mixture, with the range of 68 to 72 wt % being preferred. When the above-described range is satisfied, the transparency of the first copolymer can be improved.

The aromatic vinyl-based monomer may impart excellent processability to the first copolymer. The aromatic vinyl-based monomer may be included as the remainder so that the total weight of the first monomer mixture is 100 wt %.

The first monomer mixture may further include a vinyl cyanide-based monomer to improve polymerization stability and the chemical resistance of the first copolymer. The vinyl cyanide-based monomer may be included at 7 wt % or less with respect to the total weight of the first monomer mixture. When the above-described range is satisfied, the chemical resistance of the first copolymer can be improved while minimizing a yellowing phenomenon caused by the vinyl cyanide-based monomer.

A weight ratio of the diene-based rubber polymer and the first monomer mixture may be 40:60 to 60:40 or 45:55 to 55:45, with the range of 45:55 to 55:45 being preferred. When the above-described range is satisfied, the transparency and color of the first copolymer can be improved.

The first copolymer may have a degree of grafting of 45 to 65% or 50 to 60%, with the range of 50 to 60% being preferred. When the above-described range is satisfied, the transparency of the thermoplastic resin composition can be improved, and the compatibility of the first copolymer with the second copolymer can also be improved.

Meanwhile, the transparency of the first copolymer may be determined by a difference between the refractive index of the diene-based rubber polymer and the refractive index of a shell which is a copolymer of the first monomer mixture. That is, for the first copolymer to realize excellent transparency, the refractive index of the diene-based rubber polymer and the refractive index of a shell may differ by 0.01 or less, and no difference in refractive index is preferred.

In addition, for the thermoplastic resin composition to realize excellent transparency, the refractive indices of the first copolymer and the second copolymer may differ by 0.01 or less, and no difference in refractive index is preferred.

The first copolymer may have a refractive index of 1.5 to 1.525 or 1.51 to 1.52, with the range of 1.51 to 1.52 being preferred. When the above-described range is satisfied, the first copolymer may work synergistically with the second copolymer to be described below to improve the transparency of the thermoplastic resin composition.

(2) Second Copolymer

The second copolymer, which is a non-graft copolymer, is a copolymer of a second monomer mixture including an alkyl(meth)acrylate-based monomer and an aromatic vinyl-based monomer.

The second copolymer may impart excellent transparency and processability to the thermoplastic resin composition.

The alkyl(meth)acrylate-based monomer may be included at 64 to 75 wt % or 68 to 72 wt % with respect to the total weight of the second monomer mixture, with the range of 68 to 87 wt % being preferred. When the above-described range is satisfied, the transparency of the second copolymer can be improved, and the compatibility of the second copolymer with the first copolymer can be improved.

The aromatic vinyl-based monomer may impart excellent processability to the second copolymer. The aromatic vinyl-based monomer may be included as the remainder so that the total weight of the second monomer mixture is 100 wt %. The second monomer mixture may further include a vinyl cyanide-based monomer to improve polymerization stability and the chemical resistance of the second copolymer. The vinyl cyanide-based monomer may be included at 7 wt % or less with respect to the total weight of the second monomer mixture. When the above-described range is satisfied, the chemical resistance of the second copolymer can be improved while minimizing a yellowing phenomenon caused by the vinyl cyanide-based monomer.

The second copolymer may have a refractive index of 1.5 to 1.525 or 1.51 to 1.52, with the range of 1.5 to 1.52 being preferred. When the above-described range is satisfied, the transparency of the thermoplastic resin composition can be improved.

The second copolymer may be prepared by suspension polymerization or bulk polymerization of a monomer mixture including an alkyl(meth)acrylate-based monomer and an aromatic vinyl-based monomer, with bulk polymerization capable of preparing a high-purity copolymer being preferred.

The base resin may include the first copolymer and the second copolymer in a weight ratio of 70:30 to 90:10 and preferably includes the first and second copolymers in a weight ratio of 75:25 to 85:15. When the above-described range is satisfied, the amount of the diene-based rubber polymer in the thermoplastic resin composition increases, and thus softness can be significantly improved. Accordingly, the force of artificial nails manufactured using the thermoplastic resin composition to restore the original shape in an attached state to natural nails, is weakened, and thus wearing comfort can be improved. However, below the above-described range, softness is not improved due to an excessive increase in flexural strength and flexural modulus, and artificial nails manufactured using the thermoplastic resin composition may have degraded wearing comfort. Above the above-described range, processability and transparency may be degraded.

2) Plasticizer

The plasticizer is used to enhance processability and softness while maintaining the transparency of the thermoplastic resin composition and may have a viscosity of 1,500 to 5,000 cps, 2,000 to 4,000 cps, or 2,000 to 3,500 cps. The plasticizer preferably has a viscosity of 2,000 to 4,000 cps and more preferably has a viscosity of 2,000 to 3,500 cps. When the viscosity of the plasticizer satisfies the above-described range, a thermoplastic resin composition which realizes excellent migration resistance, processability, and transparency can be prepared.

The plasticizer may have a refractive index of 1.45 or more, 1.45 to 1.6, or 1.45 to 1.52, with the range of 1.45 to 1.52 being preferred. When the refractive index of the plasticizer satisfies the above-described condition, the transparency of the thermoplastic resin composition can be improved. In addition, artificial nails manufactured using such a thermoplastic resin composition can not only have excellent transparency but also realize various colors.

The plasticizer is preferably a polymer plasticizer which is not a phthalate-based plasticizer that causes environmental issues and is more preferably a polyester-based plasticizer. The plasticizer is preferably one or more selected from the group consisting of polydi(2-ethylhexyl)glycoladipate; hexanedioic acid, polymer with 1,3-butanediol, 2-ethylhexyl ester; hexanedioic acid, polymer with 1,3-butanediol and 1,2-propanediol, 2-ethylhexyl ester; and hexanedioic acid, polymer with 2,2-dimethyl-1,3-propanediol and 1,2-propanediol, isononyl ester.

As the plasticizer, among commercially available products, one or more selected from the group consisting of SONGCIZER™ P-2600 manufactured by Songwon Industrial Co., Ltd, SONGCIZER™ P-3000 manufactured by Songwon Industrial Co., Ltd, and Palamoll® 652 manufactured by BASF Corporation may be used.

The plasticizer may be included in an amount of 4 to 10 parts by weight, 5 to 10 parts by weight, or 5 to 9 parts by weight with respect to 100 parts by weight of the base resin, with the range of 5 to 9 parts by weight being preferred. When the above-described range is satisfied, the transparency and processability of the thermoplastic resin composition can be improved, and a migration phenomenon of the plasticizer can be prevented.

2. Thermoplastic Resin Molded Article

A thermoplastic resin molded article according to another embodiment of the present invention is made of the thermoplastic resin composition according to the embodiment of the present invention and has a haze of 2.0% or less, a flexural strength of 280 to 420 kg/cm$^2$, and a flexural modulus of 11,000 to 13,500 kg/cm$^2$. Preferably, the thermoplastic resin molded article has a haze of 1.8% or less, a flexural strength of 300 to 400 kg/cm$^2$, and a flexural modulus of 11,500 to 13,000 kg/cm$^2$. When the above-described conditions are satisfied, excellent transparency and softness can be realized, and thus the thermoplastic resin molded article is suitable for artificial nails. When the haze exceeds the above-described range, transparency is degraded. In addition, when the flexural strength and flexural modulus are below the above-described ranges, the thermoplastic resin molded article may be easily deformed when used in the manufacture of artificial nails. When the flexural strength and flexural modulus exceed the above-described ranges, a restoring force to restore the original shape is increased, and thus artificial nails may be easily detached from user's nails, or wearing comfort may be lowered.

Meanwhile, haze may be measured in accordance with ASTM D1003, and flexural strength and flexural modulus may be measured in accordance with ASTM D790.

Hereinafter, exemplary embodiments of the present invention will be described in detail so that those of ordinary skill in the art can easily carry out the present invention. However, it should be understood that the present invention can be implemented in various forms and that the exemplary embodiments are not intended to limit the present invention thereto.

PREPARATION EXAMPLE 1

50 parts by weight (based on solid content) of butadiene rubber polymer latex (average particle diameter: 120 nm, gel content: 90%), 50 parts by weight of ion exchanged water, 8.8 parts by weight of methyl methacrylate, 3 parts by weight of styrene, 0.8 parts by weight of acrylonitrile, 0.1 parts by weight of divinylbenzene as a crosslinking agent, 0.2 parts by weight of cumene hydroperoxide as an initiator, and 0.5 parts by weight of sodium dodecylbenzenesulfonate as an emulsifier were batch-added to a nitrogen-substituted reactor and mixed for 5 hours. Subsequently, polymerization was performed while continuously adding, to the reactor, 26.2 parts by weight of methyl methacrylate, 9 parts by weight of styrene, 2.2 parts by weight of acrylonitrile, 0.5 parts by weight of t-dodecyl mercaptan as a molecular weight controlling agent, 0.05 parts by weight of disodium ethylenediamine tetraacetate, 0.1 parts by weight of sodium formaldehyde sulfoxylate, and 0.001 parts by weight of ferrous sulfate as activators, and 0.1 parts by weight of cumene hydroperoxide as an initiator at 70° C. and a constant rate for 5 hours. After the continuous addition was terminated, the temperature was raised to 80° C., aging was performed for an hour, and the polymerization was then terminated to obtain a graft copolymer latex. The graft copolymer latex was coagulated by adding 2 parts by weight of magnesium sulfate as a coagulant, aged, dehydrated, and dried to obtain a graft copolymer powder. In this case, the graft copolymer powder had a refractive index of 1.516 and a degree of grafting of 55%.

PREPARATION EXAMPLE 2

50 parts by weight (based on solid content) of butadiene rubber polymer latex (average particle diameter: 300 nm, gel content: 70%), 50 parts by weight of ion exchanged water, 8.8 parts by weight of methyl methacrylate, 3 parts by weight of styrene, 0.8 parts by weight of acrylonitrile, 0.1 parts by weight of divinylbenzene as a crosslinking agent, 0.2 parts by weight of cumene hydroperoxide as an initiator, and 0.5 parts by weight of sodium dodecylbenzenesulfonate as an emulsifier were added to a nitrogen-substituted reactor and mixed for 3 hours. Subsequently, polymerization was performed while continuously adding, to the reactor, 26.2 parts by weight of methyl methacrylate, 9 parts by weight of styrene, 2.2 parts by weight of acrylonitrile, 0.5 parts by weight of t-dodecyl mercaptan as a molecular weight controlling agent, 0.05 parts by weight of disodium ethylenediamine tetraacetate, 0.1 parts by weight of sodium formaldehyde sulfoxylate, and 0.001 parts by weight of ferrous sulfate as activators, and 0.1 parts by weight of cumene hydroperoxide as an initiator at 70° C. and a constant rate for 5 hours. After the continuous addition was terminated, the temperature was raised to 80° C., aging was performed for an hour, and the polymerization was then terminated to obtain a graft copolymer latex. The graft copolymer latex was coagulated by adding 2 parts by weight of magnesium sulfate as a coagulant, aged, dehydrated, and dried to obtain a graft copolymer powder. In this case, the graft copolymer powder had a refractive index of 1.516 and a degree of grafting of 45%.

PREPARATION EXAMPLE 3

Polymerization was performed while continuously adding, to a nitrogen-substituted reactor, 70.4 parts by weight of methyl methacrylate, 24.6 parts by weight of styrene, 5 parts by weight of acrylonitrile, 30 parts by weight of toluene, and 0.15 parts by weight of t-dodecyl mercaptan as a molecular weight controlling agent at 148° C. and a constant rate for 3 hours, thereby obtaining a copolymer. The copolymer was heated in a preheating bath, and unreacted monomers and a solvent were removed in a volatilization tank. Subsequently, the copolymer, from which unreacted monomers and the like had been removed, was input into a polymer transfer pump extruder and extruded at 210° C. to obtain a pellet-type copolymer. The resulting copolymer had a weight-average molecular weight of 90,000 g/mol and a refractive index of 1.516.

EXAMPLES AND COMPARATIVE EXAMPLES

The specifications of components used in Examples and Comparative Examples are as follows.
(A) Graft copolymer
(A-1): The graft copolymer prepared in Preparation Example 1 was used.
(A-2): The graft copolymer prepared in Preparation Example 2 was used.
(A-3): Methyl methacrylate/acrylonitrile/butadiene/styrene graft copolymer: TR557-NP commercially available from LG Chem Ltd. (refractive index: 1.516, average particle diameter of butadiene rubber polymer: 300 nm) was used.
(B) Non-graft copolymer: The copolymer prepared in Preparation Example 3 was used.
(C) Plasticizer
(C-1): SONGCIZER™ P-2600 commercially available from Songwon Industrial Co., Ltd (viscosity: 2,700 to 3,500 cps, refractive index: 1.462 to 1.468, polydi(2-ethylhexyl) glycoladipate) was used.
(C-2): SONGCIZER™ P-3000 commercially available from Songwon Industrial Co., Ltd (viscosity: 2,000 to 3,200 cps, refractive index: 1.462 to 1.468, polydi(2-ethylhexyl) glycoladipate) was used.
(C-3): Palamoll® 652 commercially available from BASF Corporation (viscosity: 2,000 cps, refractive index: 1.465, hexanedioic acid, polymer with 2,2-dimethyl-1,3-propanediol and 1,2-propanediol, isononyl ester) was used.
(D) Styrene/butadiene copolymer: KR-03 commercially available from Chevron (refractive index: 1.571) was used.
The above-described components were mixed in contents shown in Table 1 to Table 5 and stirred to prepare thermoplastic resin compositions.

Experimental Example 1

Each of the thermoplastic resin compositions of Examples and Comparative Examples was input into a twin-screw extruder set at 230° C. and then extruded to prepare a pellet. The melt flow index of the pellet was measured by a method described below, and results thereof are shown in Table 1 to Table 5.
(1) Melt flow index (g/10 min): measured under conditions of 220° C. and 10 kg in accordance with ASTM D1238.

Experimental Example 2

The pellet prepared in Experimental Example 1 was injection-molded at 230° C. to prepare a specimen. Physical properties of the specimen were measured by methods described below, and results thereof are shown in Table 1 to Table 5.
(2) Haze (%): measured in accordance with ASTM D1003.
(3) Flexural strength (kg/cm$^2$): measured in accordance with ASTM D790.
(4) Flexural modulus (kg/cm$^2$): measured in accordance with ASTM D790.
(5) Hardness: measured in accordance with ASTM D785 (R-scale).
(6) Migration: evaluated by placing the specimen on oil paper in a 70° C. oven, applying a weight of 10 kg onto the specimen, storing it for a week, and then observing the change of the oil paper. When migrated, the plasticizer wets the oil paper so as to discolor the oil paper, and thus the discoloration means that the oil paper was stained with the plasticizer due to the migration of the plasticizer. Therefore, no discoloration was indicated as "OK", and discoloration was indicated as "NG".

TABLE 1

| Classification | | Comparative Example 1 | Comparative Example 2 | Example 1 | Example 2 | Example 3 | Comparative Example 3 | Comparative Example 4 |
|---|---|---|---|---|---|---|---|---|
| (A) Graft copolymer (parts by weight) | (A-1) | 50 | 65 | 70 | 85 | 90 | 95 | 0 |
| | (A-2) | 0 | 0 | 0 | 0 | 0 | 0 | 70 |
| | (A-3) | 0 | 0 | 0 | 0 | 0 | 0 | 0 |
| (B) Non-graft copolymer (parts by weight) | | 50 | 35 | 30 | 15 | 10 | 5 | 30 |
| (C) Plasticizer (parts by weight) | (C-1) | 5 | 5 | 5 | 5 | 5 | 5 | 5 |
| | (C-2) | 0 | 0 | 0 | 0 | 0 | 0 | 0 |
| | (C-3) | 0 | 0 | 0 | 0 | 0 | 0 | 0 |
| (D) Styrene/butadiene copolymer (parts by weight) | | 0 | 0 | 0 | 0 | 0 | 0 | 0 |
| ① Melt flow index | | 19.2 | 15.0 | 13.8 | 11.0 | 10.1 | 4.4 | 15.7 |
| ② Haze | | 0.9 | 1.0 | 1.0 | 1.4 | 1.5 | 2.2 | 3.8 |
| ③ Flexural strength | | 570 | 480 | 377 | 320 | 304 | 300 | 360 |
| ④ Flexural modulus | | 16,500 | 16,000 | 12,300 | 12,000 | 11,800 | 11,150 | 10,400 |
| ⑤ Hardness | | 95 | 90 | 83 | 80 | 76 | 68 | 77 |
| ⑥ Migration | | OK | OK | OK | OK | OK | OK | OK |

TABLE 2

| Classification | | Example 4 | Example 5 | Example 6 | Example 7 |
|---|---|---|---|---|---|
| (A) Graft copolymer (parts by weight) | (A-1) | 85 | 85 | 85 | 85 |
| | (A-2) | 0 | 0 | 0 | 0 |
| | (A-3) | 0 | 0 | 0 | 0 |
| (B) Non-graft copolymer (parts by weight) | | 15 | 15 | 15 | 15 |
| (C) Plasticizer (parts by weight) | (C-1) | 4 | 6 | 9 | 10 |
| | (C-2) | 0 | 0 | 0 | 0 |
| | (C-3) | 0 | 0 | 0 | 0 |
| (D) Styrene/butadiene copolymer (parts by weight) | | 0 | 0 | 0 | 0 |
| ① Melt flow index | | 7.7 | 11.9 | 14.5 | 15.0 |
| ② Haze | | 1.4 | 1.3 | 2.0 | 2.0 |
| ③ Flexural strength | | 310 | 316 | 310 | 311 |
| ④ Flexural modulus | | 12,500 | 12,000 | 11,900 | 11,900 |
| ⑤ Hardness | | 76 | 79 | 77 | 77 |
| ⑥ Migration | | OK | OK | OK | OK |

TABLE 3

| Classification | | Comparative Example 5 | Example 8 | Example 9 | Example 10 | Comparative Example 6 |
|---|---|---|---|---|---|---|
| (A) Graft copolymer (parts by weight) | (A-1) | 65 | 70 | 75 | 90 | 95 |
| | (A-2) | 0 | 0 | 0 | 0 | 0 |
| | (A-3) | 0 | 0 | 0 | 0 | 0 |
| (B) Non-graft copolymer (parts by weight) | | 35 | 30 | 25 | 10 | 5 |
| (C) Plasticizer (parts by weight) | (C-1) | 0 | 0 | 0 | 0 | 0 |
| | (C-2) | 6 | 5 | 9 | 7 | 9 |
| | (C-3) | 0 | 0 | 0 | 0 | 0 |
| (D) Styrene/butadiene copolymer (parts by weight) | | 0 | 0 | 0 | 0 | 0 |
| ① Melt flow index | | 15.3 | 13.0 | 16.0 | 10.3 | 8.0 |
| ② Haze | | 1.1 | 1.2 | 1.8 | 1.5 | 2.5 |
| ③ Flexural strength | | 460 | 370 | 342 | 305 | 290 |
| ④ Flexural modulus | | 16,000 | 12,400 | 12,100 | 11,800 | 11,200 |
| ⑤ Hardness | | 90 | 81 | 80 | 76 | 68 |
| ⑥ Migration | | OK | OK | OK | OK | OK |

TABLE 4

| Classification | | Example 11 | Example 12 | Example 13 |
|---|---|---|---|---|
| (A) Graft copolymer (parts by weight) | (A-1) | 70 | 70 | 80 |
| | (A-2) | 0 | 0 | 0 |
| | (A-3) | 0 | 0 | 0 |
| (B) Non-graft copolymer (parts by weight) | | 30 | 30 | 20 |
| (C) Plasticizer (parts by weight) | (C-1) | 0 | 0 | 0 |
| | (C-2) | 0 | 0 | 0 |
| | (C-3) | 4 | 5 | 9 |
| (D) Styrene/butadiene copolymer (parts by weight) | | 0 | 0 | 0 |
| ① Melt flow index | | 8.5 | 12.6 | 15.2 |
| ② Haze | | 1.0 | 1.1 | 1.9 |
| ③ Flexural strength | | 370 | 366 | 330 |
| ④ Flexural modulus | | 12,400 | 12,300 | 12,100 |
| ⑤ Hardness | | 84 | 84 | 79 |
| ⑥ Migration | | OK | OK | OK |

TABLE 5

| Classification | | Comparative Example 7 | Comparative Example 8 |
|---|---|---|---|
| (A) Graft copolymer (parts by weight) | (A-1) | 0 | 0 |
| | (A-2) | 0 | 0 |
| | (A-3) | 100 | 60 |
| (B) Non-graft copolymer (parts by weight) | | 0 | 0 |
| (C) Plasticizer (parts by weight) | (C-1) | 0 | 0 |
| | (C-2) | 0 | 0 |
| | (C-3) | 0 | 0 |
| (D) Styrene/butadiene copolymer (parts by weight) | | 0 | 40 |
| ① Melt flow index | | 23.0 | 53.3 |
| ② Haze | | 2.0 | Opaque |
| ③ Flexural strength | | 720 | 515 |
| ④ Flexural modulus | | 23,000 | 17,793 |
| ⑤ Hardness | | 104 | 36 |
| ⑥ Migration | | OK | OK |

Referring to Table 1, Examples 1 to 3 including appropriate amounts of a graft copolymer and a non-graft copolymer were excellent in all of a melt flow index, haze, flexural strength, flexural modulus, hardness, and migration and thus suitable for artificial nails. On the other hand, Comparative Examples 1 and 2 including a small amount of a graft copolymer exhibited higher flexural strength, higher flexural modulus, and higher hardness compared to Examples 1 to 3 and thus were not suitable for artificial nails. In addition, Comparative Example 3 including an excessive amount of a graft copolymer exhibited a lower melt flow index and higher haze compared to Examples 1 to 3, resulting in degraded processability, and thus was not suitable for artificial nails. Comparative Example 4 including a diene-based rubber polymer having a large average particle diameter exhibited high haze and low flexural modulus and thus was not suitable for artificial nails. Referring to Table 2, it can be seen that as the plasticizer content is increased within the appropriate plasticizer content range, haze is maintained, and a melt flow index is increased. In particular, it can be seen that Examples 5 to 7 exhibited melt flow indices of 10 g/10 min or more, resulting in excellent processability, as compared to Example 4.

Referring to Table 3, Examples 8 to 10 including optimal amounts of a graft copolymer and a non-graft copolymer were excellent in all of a melt flow index, haze, flexural strength, flexural modulus, hardness, and migration and thus suitable for artificial nails. On the other hand, Comparative Example 5 including a small amount of a graft copolymer exhibited relatively high flexural strength, high flexural modulus, and high hardness and thus was not suitable for artificial nails. Comparative Example 6 including an excessive amount of a graft copolymer exhibited a relatively low melt flow index, resulting in degraded processability, and also exhibited relatively high haze and low flexural modulus, and thus was not suitable for artificial nails.

Referring to Table 4, Examples 11 to 13 satisfying the appropriate plasticizer content range were excellent in all of haze, flexural strength, flexural modulus, hardness, and migration and thus suitable for artificial nails. In particular, it can be seen that Examples 12 and 13 exhibited melt flow indices of 10 g/10 min or more, resulting in excellent processability, as compared to Example 11.

Referring to Table 5, Comparative Example 7 consisting of only a graft copolymer exhibited relatively high flexural strength, high flexural modulus, and high hardness and thus was not suitable for artificial nails, and Comparative Example 8 consisting of a graft copolymer and a styrene/butadiene copolymer was opaque and exhibited relatively high flexural strength and high flexural modulus and thus was not suitable for artificial nails.

The invention claimed is:

1. A thermoplastic resin molded article made of a thermoplastic resin composition comprising:
a base resin including, in a weight ratio of 70:30 to 90:10,
a first copolymer formed by graft polymerization of a diene-based rubber polymer having an average particle diameter of 50 to 200 nm with a first monomer mixture including an alkyl (meth)acrylate-based monomer and an aromatic vinyl-based monomer and a second copolymer which is a copolymer of a second monomer mixture including an alkyl (meth)acrylate-based monomer and an aromatic vinyl-based monomer; and
a plasticizer,
wherein the base resin is included in an amount of 100 parts by weight, and the plasticizer is included in an amount of 4 to 10 parts by weight, and
wherein the thermoplastic resin molded article has a haze of 2.0% or less, a flexural strength of 280 to 420 kg/cm$^2$, and a flexural modulus of 11,000 to 13,500 kg/cm$^2$.

2. The thermoplastic resin molded article of claim 1, wherein the plasticizer is a polyester-based plasticizer.

3. The thermoplastic resin molded article of claim 1, wherein the plasticizer has a viscosity of 1,500 to 5,000 cps.

4. The thermoplastic resin molded article of claim 1, wherein the plasticizer is one or more selected from the group consisting of: polydi(2-ethylhexyl)glycoladipate; hexanedioic acid, polymer with 1,3-butanediol, 2-ethylhexyl ester; hexanedioic acid, polymer with 1,3-butanediol and 1,2-propanediol, 2-ethylhexyl ester; and hexanedioic acid, polymer with 2,2-dimethyl-1,3-propanediol and 1,2-propanediol, isononyl ester.

5. The thermoplastic resin molded article of claim 1, wherein the plasticizer has a refractive index of 1.45 to 1.6.

6. The thermoplastic resin molded article of claim 1, wherein the refractive indices of the first copolymer and the second copolymer differ by 0.01 or less.

7. The thermoplastic resin molded article of claim 1, wherein each of the first and second monomer mixtures further includes a vinyl cyanide-based monomer.

* * * * *